(12) United States Patent
Herborth et al.

(10) Patent No.: US 8,337,090 B2
(45) Date of Patent: Dec. 25, 2012

(54) BEARING SUPPORT FLEXIBLE RING

(75) Inventors: Jason Herborth, Acton (CA); Lena Raykowski, Mississauga (CA); Dave Beamish, Mississauga (CA)

(73) Assignee: Pratt & Whitney Canada Corp., Longueuil (CA)

( * ) Notice: Subject to any disclaimer, the term of this patent is extended or adjusted under 35 U.S.C. 154(b) by 597 days.

(21) Appl. No.: 12/557,293

(22) Filed: Sep. 10, 2009

(65) Prior Publication Data
US 2011/0058759 A1    Mar. 10, 2011

(51) Int. Cl.
*F16C 27/00* (2006.01)
*F16C 27/04* (2006.01)

(52) U.S. Cl. ........ 384/535; 384/215; 384/536; 384/581; 384/582

(58) Field of Classification Search ............ 384/99, 384/119, 215, 534–537, 581–582; 415/174.2, 415/231; 416/210 A, 214, 500
See application file for complete search history.

(56) References Cited

U.S. PATENT DOCUMENTS

| | | | |
|---|---|---|---|
| 1,386,255 A | | 8/1921 | Hindle et al. |
| 2,631,901 A | | 3/1953 | Holben et al. |
| 2,926,051 A | * | 2/1960 | Cazier et al. ................. 384/535 |
| 3,063,761 A | | 11/1962 | Hoddy et al. |
| 3,163,353 A | | 12/1964 | Petrie |
| 3,738,717 A | | 6/1973 | Gardner |
| 3,980,352 A | | 9/1976 | Carlson |
| 4,097,094 A | | 6/1978 | Gardner |
| 4,119,874 A | | 10/1978 | Beavers et al. |
| 4,213,661 A | | 7/1980 | Marmol |
| 4,262,975 A | | 4/1981 | Heshmat et al. |
| 4,300,806 A | | 11/1981 | Heshmat |
| 4,425,078 A | | 1/1984 | Robbins |
| 4,525,996 A | | 7/1985 | Wright et al. |
| 4,553,855 A | * | 11/1985 | De Choudhury ............. 384/215 |
| 4,772,139 A | | 9/1988 | Bretton |
| 4,799,653 A | | 1/1989 | Kramer |
| 4,952,076 A | * | 8/1990 | Wiley et al. ..................... 384/99 |
| 4,981,415 A | * | 1/1991 | Marmol et al. .................. 384/99 |
| 5,044,784 A | * | 9/1991 | Lisowsky ...................... 384/582 |
| 5,044,789 A | * | 9/1991 | Damon et al. ................ 384/581 |
| 5,056,935 A | | 10/1991 | Singh |
| 5,201,585 A | | 4/1993 | Gans et al. |
| 5,498,083 A | | 3/1996 | Brown |
| 5,564,903 A | * | 10/1996 | Eccles et al. .................. 384/535 |

(Continued)

FOREIGN PATENT DOCUMENTS

EP    926387    7/2005

(Continued)

OTHER PUBLICATIONS

M. Leontiev, Rotor-Bearing Dynamics Technology Design Guide, Damper Supports, 1996.

(Continued)

*Primary Examiner* — Marcus Charles
(74) *Attorney, Agent, or Firm* — Norton Rose Canada LLP (57) ABSTRACT

A bearing support ring includes a plurality of contact pads radially protruding from inner and outer circumferential surfaces of the ring. Flexible portions of the ring are defined between the contact pads and have a radial thickness less than that of the ring at the contact pads, such as to permit elastic deflection of the ring in a radial direction between the contact pads. Openings sized to permit unrestricted oil flow are provided, such as within the flexible portions of the ring.

19 Claims, 5 Drawing Sheets

U.S. PATENT DOCUMENTS

| | | | |
|---|---|---|---|
| 5,803,441 | A | 9/1998 | Yamamoto |
| 6,158,893 | A | 12/2000 | Heshmat |
| 6,196,721 | B1 | 3/2001 | Farkaly |
| 6,227,794 | B1 | 5/2001 | Wojtyczka et al. |
| 6,749,342 | B1 * | 6/2004 | Leins et al. .................. 384/536 |
| 6,964,521 | B2 | 11/2005 | McDearmon |
| 7,036,989 | B2 | 5/2006 | Taki et al. |
| 7,052,183 | B2 * | 5/2006 | Chen et al. .................. 384/536 |
| 7,056,025 | B2 | 6/2006 | Nakata |
| RE39,190 | E | 7/2006 | Weissert |
| 7,478,952 | B2 * | 1/2009 | Faust et al. .................. 384/536 |
| 7,589,447 | B2 * | 9/2009 | Stout et al. .................. 384/119 |
| 7,699,526 | B2 * | 4/2010 | McMurray et al. ............. 384/99 |
| 2002/0136473 | A1 | 9/2002 | Mollmann |
| 2006/0083448 | A1 | 4/2006 | Alam et al. |
| 2007/0006393 | A1 | 1/2007 | Ishida et al. |
| 2007/0086685 | A1 | 4/2007 | Klusman et al. |
| 2007/0248293 | A1 | 10/2007 | Pettinato et al. |
| 2008/0087018 | A1 | 4/2008 | Woollenweber |

FOREIGN PATENT DOCUMENTS

| | | |
|---|---|---|
| EP | 1666763 | 6/2006 |
| EP | 1770318 | 4/2007 |
| EP | 1490583 | 6/2007 |

OTHER PUBLICATIONS

I. A. Birger, B. F. Shorr, Aircraft Gas Turbine Engine Dynamics, Moscow, Mashinostroenie, 1981, 232 pages.

JP09-014262, Dynamic Pressure Gas Journal Bearing, Mitsubishi Heavy Industries Ltd., Patent Abstracts of Japan, Jan. 14, 1997.

"Experimental Investigation of Dynamic Properties of an Active Journal Bearing;" Journal of Sound and Vibration; vol. 230, No. 5; 2000; pp. 1103-1117 <http://cat.inist.fr/?aModele=afficheN&cpsidt=1302736>.

"Reduced Temperature Tiltpad Journal Bearings" <http://www.rmt-inc.com/rt-tiltpad.html>.

* cited by examiner

BEARING SUPPORT FLEXIBLE RING

TECHNICAL FIELD

The application relates generally to vibration reduction in gas turbine engines.

BACKGROUND

In gas turbine engines, bearing-supported high speed rotating shafts are subject to rotor vibrations, which vibrations can be transmitted outwardly to the engine casing. As engine vibration is generally undesirable, various approaches have been used in an attempt to reduce the vibrations transmitted to the engine casing. Such efforts include squeeze film oil dampers, which provide a thin cushion of oil to the outer race of the bearing to damp out vibrations, and hence decrease transmission to the engine case. Oil film damping adds considerable weight, complexity and hence, cost, to the bearing assembly, however, due to the associated hardware required and the modifications required to the oil system of the engine.

Accordingly, there is a need to provide an improved solution to the control of engine vibration.

SUMMARY

There is provided a bearing arrangement for radially supporting a rotatable shaft within a gas turbine engine, the bearing arrangement comprising: a bearing having an inner race adapted to be mounted to the shaft and an outer race; a bearing housing adapted to be mounted within a casing of the gas turbine engine; and a bearing support ring radially disposed between the bearing housing and the outer race of the bearing, the ring having a plurality of circumferentially alternating and spaced apart first and second contact pads, the first and second contact pads respectively radially protruding from inner and outer circumferential surfaces of the ring, the first contact pads being circumferentially offset from the second contact pads such as to define flexible portions of the ring therebetween, the flexible portions of the ring having a radial thickness less than that of the ring at respective locations of said first and second contact pads, the flexible portions permitting elastic deflection of the ring in a radial direction between adjacent ones of the first and second pads, wherein a radial gap exists between the first and second contact pads and the outer race of the bearing and the bearing housing, respectively, when the flexible portions of the bearing support are un-deflected, and a plurality of openings extending transversely across the flexible portions of the ring, the openings sized to permit a substantially unrestricted flow of oil between radially inner and outer sides of said ring.

There is also provided a bearing support for supporting a rotating shaft bearing within a bearing housing of a gas turbine engine, the bearing support comprising: an annular body defining a radially inner circumferential and a radially outer circumferential surface; a plurality of circumferentially spaced apart first contact pads disposed on the radially inner circumferential surface of the annular body, and a plurality of circumferentially spaced apart second contact pads disposed on the radially outer circumferential surface of the annular body, the second contact pads being circumferentially offset from the first contact pads, the first and second contact pads having a radial thickness greater than that of portions of the annular body circumferentially disposed between the first and second contact pads, said portions being elastically deflectable in a radial direction, the first contact pads being adapted for abutting an outer race of the bearing and the second contact pads being adapted for abutting the bearing housing of the gas turbine engine, and wherein a radial gap exists between the first contact pads and the outer race of the bearing and between the second contact pads and the bearing housing, when said portions of the annular body are un-deflected; and a plurality of oil-flow openings extending at least transversely across the annular body, said openings being oversized to permit substantially un-restricted oil to flow therethrough between radially inner and outer sides of said annular body.

There is further provided a bearing support for radially supporting a rotating shaft bearing within a surrounding housing in a gas turbine engine, the bearing support comprising: a ring having circumferentially successive first and second portions, the first portions being adapted for abutment with the surrounding housing and the rotating shaft bearing, the second portions disposed between each pair of said first portions being more flexible than the first portions, such as to permit elastic deflection of said second portions in a radial direction; and wherein the first portions directly transmit a radial bearing load to the housing when forced into contact therewith by bearing misalignment or vibration, and the second portions elastically deflect to at least partially absorb said bearing misalignment or vibration.

Further details will be apparent from the detailed description and figures included below.

DESCRIPTION OF THE DRAWINGS

Reference is now made to the accompanying figures, in which:

FIG. 4b is an enlarged, partial side view of the bearing support shown in FIG. 4a;

DETAILED DESCRIPTION

Figure 1:
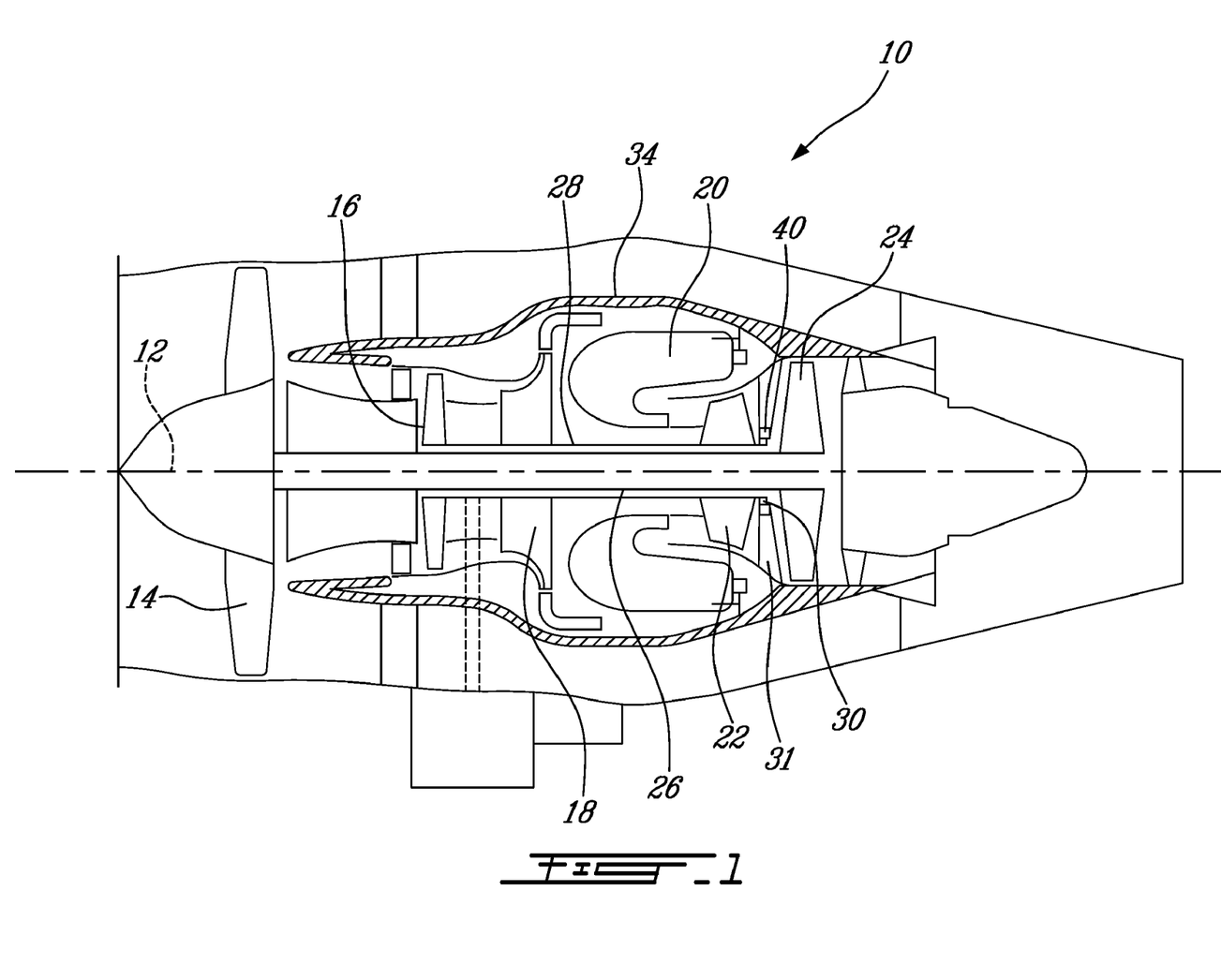
FIG. 1 is a schematic cross-sectional view of a gas turbine engine.

FIG. 1 illustrates a gas turbine engine 10 of a type preferably provided for use in subsonic flight, generally comprising in serial flow communication about a longitudinal central axis 12, fan or rotor blades 14, a low pressure compressor 16, a high pressure compressor 18, an annular combustor 20, a high pressure turbine 22, and a low pressure turbine 24. The low pressure turbine 24 is connected to both the low pressure compressor 16 and the fan blades 14 by a first rotor shaft 26, and the high pressure turbine 22 is connected to the high pressure compressor 18 by a second rotor shaft 28. The first and second rotor shafts 26, 28 are supported by respective bearing members, one of which is shown as an example and is indicated by numeral 30. This engine rotor/shaft bearing 30 may be a roller bearing, ball bearing, or other bearing suitable for use in the gas turbine engine.

Figure 2:
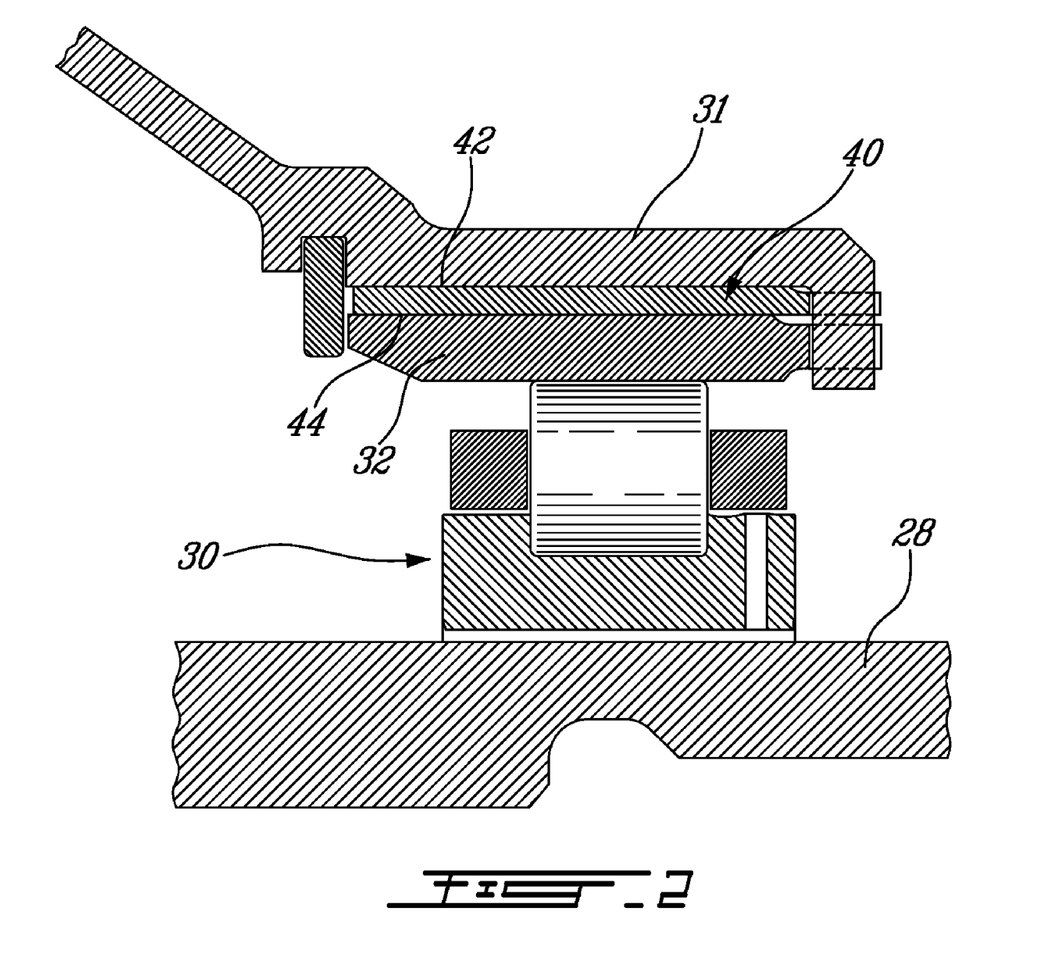
FIG. 2 is a partial, cross-sectional view of a shaft bearing of the gas turbine engine in the present bearing support arrangement.

As seen more clearly in FIG. 2, the bearing 30 is supported by a flexible, ring-shaped bearing support 40, as will be described in detail below. The bearing support 40 may be disposed in a supporting stationary structure such as bearing housing 31, which is in turn supported by and may be fixed within an annular engine casing 34 (see FIG. 1) of the engine 10. The bearing support 40 is disposed radially between the bearing housing 31 and an outer race 32 of the bearing 30 which supports a rotating shaft, such as a main rotor shaft 26 or 28 of the gas turbine engine 10. The bearing support 40 includes a radially inner circumferential surface 44 which faces the outer race 32 of the bearing 30, and may abut thereagainst when a radial bearing load is transmitted to the bearing support as a result of bearing and/or shaft misalignment or vibration. This radial load may then be transmitted by the bearing support 40 radially outwardly to the bearing housing 31, such as by abutment between portions of the radially outer circumferential surface 42 of the bearing support 40 and an inner surface of the housing 31.

Figure 3:
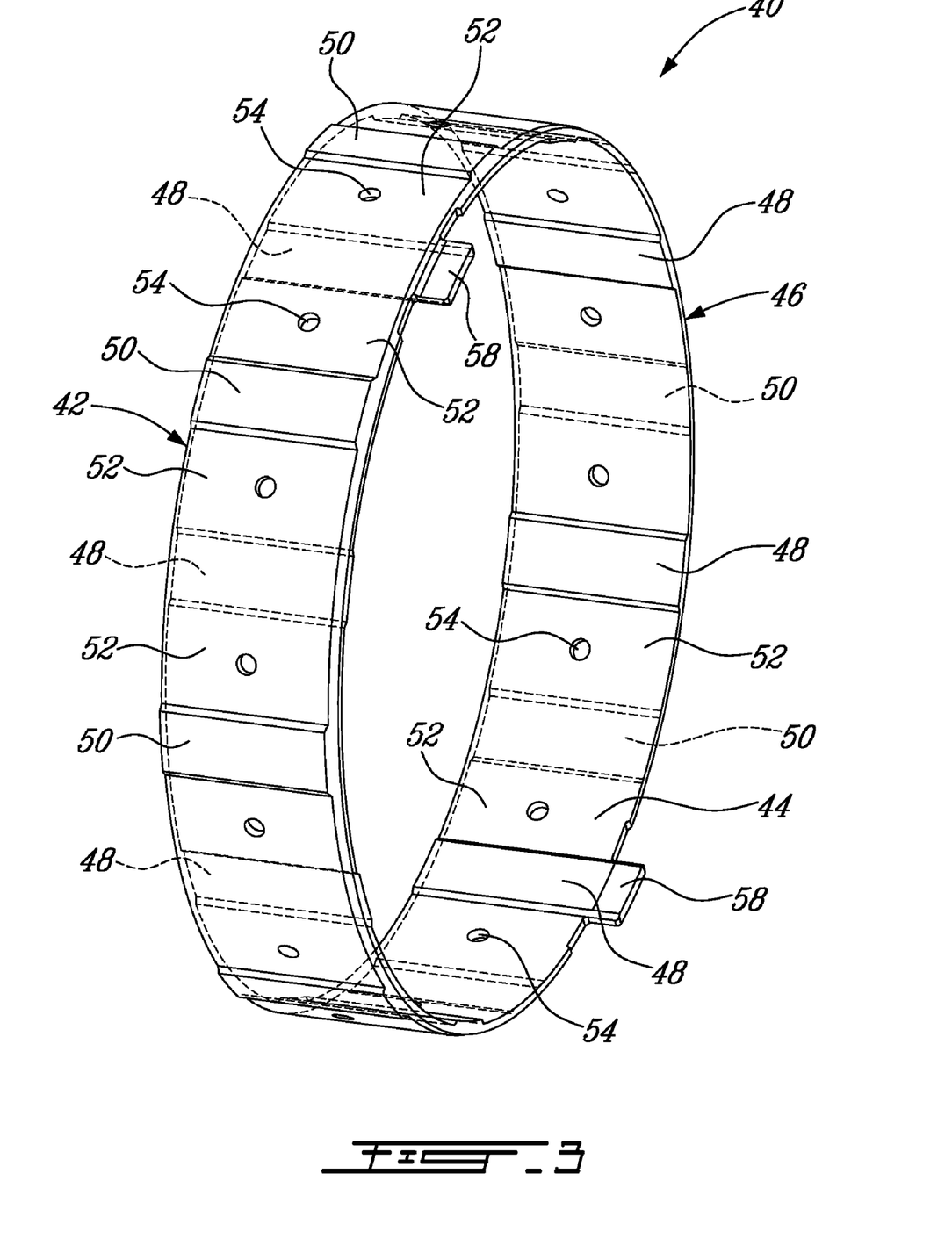
FIG. 3 is a perspective view of a bearing support ring of the present bearing support arrangement.
Figure 4A:
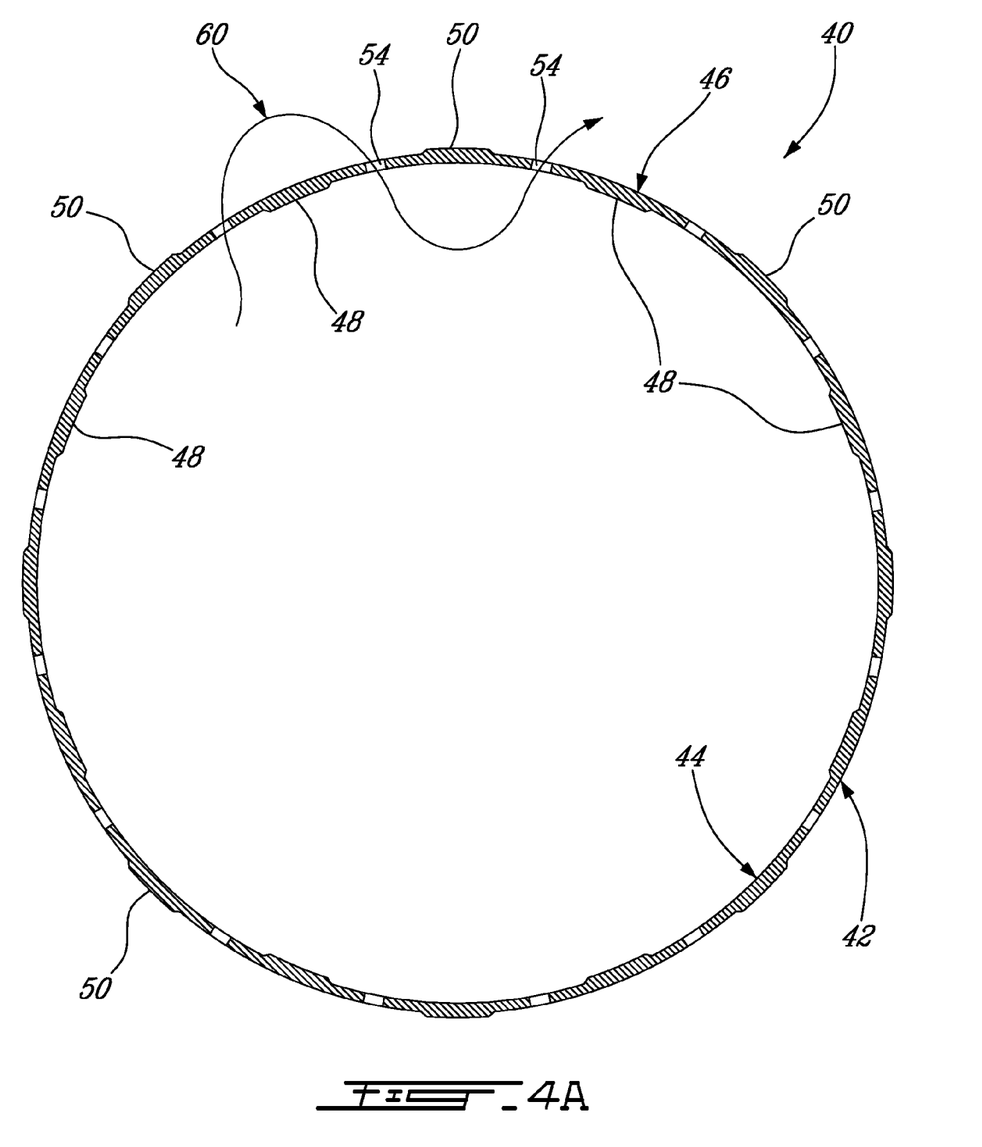
FIG. 4a is a side view of the bearing support ring of FIG. 3.
Figure 4B:
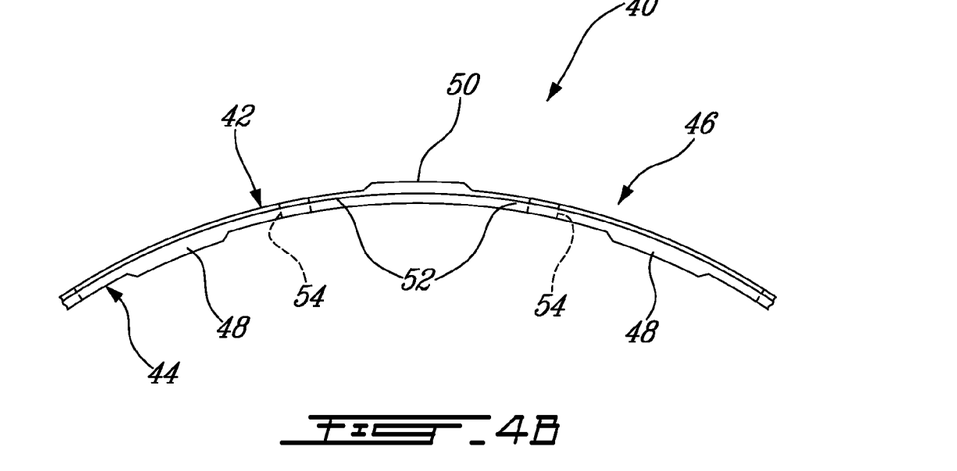

Referring to FIGS. 3-4b, the ring-shaped bearing support 40 comprises an annular body 46 having thereon the radially inner circumferential surface 44 and the radially outer circumferential surface 42 on respective inner and outer sides of the ring. The annular body 46 of the bearing support ring 40 includes a plurality of circumferentially spaced part first contact pads 48 and second contact pads 50 respectively radially protruding from the inner circumferential surface 44 and the outer circumferential surface 42. The first and second contact pads 48 and 50 in this example extend an entire axial width of the bearing support 40. The first and second contact pads 48 and 50 are clocked to circumferentially alternate, such that each first contact pad 48 on the inner surface 44 of the ring is disposed between two adjacent second contact pads 50 on the outer surface 42, for example at a midpoint therebetween. Accordingly, the first contact pads 48 are circumferentially offset from the second contact pads 50. This configuration effectively defines a flexible ring arrangement, with flexible portions (or spring elements) 52 of the ring between the alternating first and second contact pads 48 and 50. The bearing support 40 provide a flexible ring, by reason of the bearing load path that is defined through the bearing support 40, that is, from the bearing outer race to first contact pads 48, through flexible portions 52 of the ring to the second contact pad 50, and from there out to the bearing housing 31.

The contact pads 48, 50 are depicted in this example as being integrally formed as part of the annular ring body 46, e.g. such as would be provided when support 40 is machined from solid. In such a monolithic configuration, relatively thin radial thickness of the flexible portions 52 provides relatively flexibility versus the thicker (and therefore stiffer) contact pads 48, 50. Flexible steel may be used as a material. It is also to be understood, however, that the bearing support 40 may be manufactured in any suitable manner providing the functionality described herein, such as by suitably affixing contact pads 48, 50 to a separate ring body, or by the press-fitting or shrink-fitting of multiple concentric rings together, and so on. As such, the contact pads 48, 50 may be formed of a different material than the remainder of the ring, and therefore than the flexible portions 52 of the bearing support. For example the ring body 46 may be formed of a relative thin, flexible steel, to which the thicker (and therefore stiffer) contact pads 48, 50 may be affixed, such as by welding, brazing or another suitable attachment method. The contact pads 48, 50 may also be formed of the same material as the ring but having a greater radial thickness, or may be, for example, made of an abradable material.

The annular body 46 of the bearing support 40 may be integrally formed of a single piece of material and may thus be a single continuous, uninterrupted, ring. However, it is also possible that the annular body 46 of the bearing support is composed of two or more arcuate portions which are circumferentially arranged end-to-end such as to form a discontinuous ring which is received within the annular gap between the bearing 30 and the outer housing 31.

The flexible portions 52 are such that these portions 52 elastically deflect, for example in a substantially radial direction, when forced to do so by bearing loads and/or radial unbalances in the bearing 30 and/or the rotating shaft supported by the bearing with respect to the stationary outer bearing housing 31. The portions 52 of the annular body 46 are relatively less stiff than the contact pad portions 48, 50 thereof. This may be by virtue of the material of the ring and/or the relative difference in thickness, radial thickness for example, between the flexible portions 52 and the contact pads 48, 50. At one possible embodiment, the entire ring body 46 is made of high temperature steel, however other materials are possible providing they are suitable for gas turbine engine environment envelopes (high temperature, etc.) and can provide the desired spring effect. The spring constant of the material selected for at least the spring elements 52 of the annular body 46 is such that elastic deflection of these portions is possible as a result of vibrations and/or other bearing induced radial loads imposed on the bearing support 40 during operation of the gas turbine engine.

In at least one embodiment the flexible portions 52 of the ring have a radial thickness which is less than that of the ring at the circumferential locations of the contact pads 48, 50. In other words, given that the first and second contact pads 48, 50 radially protrude from the respective inner and outer surfaces 44, 42 of the annular body 46, these circumferential regions of the bearing support ring 40 are necessarily radially thicker than the portions 52 therebetween, the portions 52 thereby permitting greater elastic deflection in a radial direction and thus being relatively more flexible.

The bearing support 40, and particularly contact pads 48, 50, are sized to create a loose fit between the bearing outer race 32 and the inner diameter 44 of the ring (or sleeve) 46 of the bearing support 40, as well as a loose fit between the outer diameter 42 of the bearing support ring/sleeve 40 and the surrounding housing 31. In one embodiment, this loose fit is substantially equal on either radial side of the ring 46 (i.e. the clearance between bearing outer race and the ring 46 is about the same as the clearance between the bearing housing and the ring 46). The loose fit of the bearing support is intended so that the ring 46, and particularly the flexible portions 52 thereof, are not pre-loaded (pre-stressed).

Figure 5A:
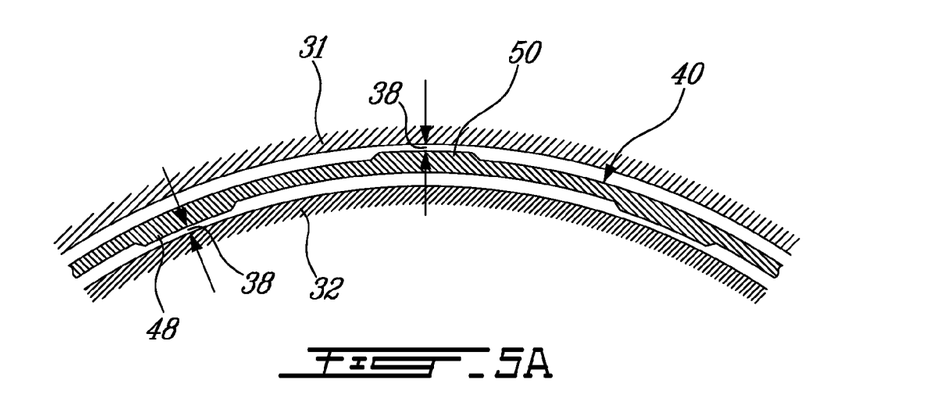
FIG. 5a is an enlarged, partial side view of the bearing support shown in an un-deflected position between a bearing outer race and a support housing.
Figure 5B:
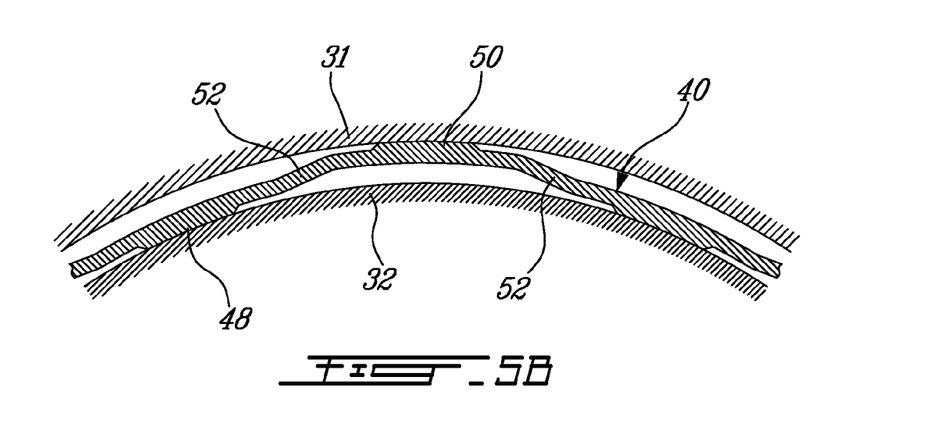
FIG. 5b is an enlarged, partial side view of the bearing support shown in a deflected position, abutted against the bearing outer race and the support housing.

As seen in FIG. 5a, this loose fit between the bearing support 40 and the bearing 30 on an inner side and the housing 31 on an outer side is such that a small radial gap 38 exists between each of the first and second contact pads 48, 50 and their respective facing surfaces of the bearing outer race 32 and the inner diameter of the housing 31. Accordingly, although the contact pads 48, 50 may be abutted, when deflection of the flexible portions 52 of the ring occurs as shown in FIG. 5b, against the respective adjacent surfaces of the bearing 30 and the housing 31 disposed on each radial side thereof, the central and un-deflected position of the bearing support 40 is such that the small radial gaps 38 exists about the full circumference of the ring between the first contact pads 48 and the bearing 30 and between the second contact pads 50 and the housing 31. The bearing support may therefore be concentric with both the bearing and the bearing housing when un-deflected and/or not displaced by loads imposed thereon by vibration and/or misalignment of the bearing and shaft. It is to be understood, however, that the outer and inner radial gaps 38 may be different sizes.

The aforementioned loose fit between the ring 46 of the bearing support 40 and the radially inner bearing 30 and the radially outer housing 31, thereby defines an inner oil chamber between each adjacent pairs of the first contact pads 48 on the inner surface 44 of the ring 46 and the outer race of the bearing, and an outer oil chamber between each adjacent pairs of the second contact pads 50 on the outer surface 42 of the ring 46 and the bearing housing 31. These inner and outer oil chambers are in fluid flow communication with each other via one or more openings 54 which transversely extend through the ring body 46, as will be described in further detail below. The openings 54 are sufficiently large such as not to significantly restrict the flow of oil between the inner and outer oil chambers, so that the oil is free to flow therebetween within the annular gap defined between the bearing 30 and the housing 31, as schematically shown at 60 in FIG. 4a. The openings 54 will be described further below.

The annular body 46 of the bearing supporting 40 also includes a plurality of fluid flow openings 54 extending transversely through the flexible portions 52 of the ring body 46. The openings 54 are sized, or rather over-sized, such as to permit substantially unrestricted oil flow communication between the radially inner and outer sides of the annular body 46. The fluid typically used to lubricate bearings includes oil, and therefore the openings 54 are sized such as to allow oil to pass relatively unrestricted from one radial side of the ring 46 to the other, without causing significant pressure build-ups and thereby substantially reducing and/or eliminating the effect of hydraulic stiffening (i.e. hydraulic damping) of the bearing retained within the bearing support 40. Accordingly, the bearing support 40 locates and retains a rotating shaft bearing 30 therewithin, without acting as a damped bearing arrangement. Rather, the oil is allowed to flow relatively freely within the annular space defined between the bearing outer race 32 and the surrounding housing 31, and therefore is able to flow from one radial side of the bearing support ring 40 to the other within this same annular space. In other embodiments, holes 54 may be replaced with slots, reduced axial-length portions of the ring, or any other configuration which permits oil communication radially across the support 40.

Unlike prior art oil-damping arrangements, it is believed (without intending to limit the generality of the appended claims) that the present bearing support decouples (rather than dampens) the bearing from the bearing housing, and hence (in this example) decouples the shaft rotor from the engine case. The solution therefore provides a lower cost, simpler alternative to a squeeze film damper, in part because of its simple construction and because of its minimal impact on adjacent hardware and on the engine oils system.

The bearing support 40 therefore acts as a flexible ring (or "flex-ring") which provides a centralization feature by supporting and centralizing the bearing 30 during rotation of the shaft 26,28 supported by the bearing 30, and therefore during typical gas turbine engine operating conditions (temperatures, rotational speeds, etc.). The bearing support 40 has been found particularly useful at maintaining the bearing centralized during middle rotational speed ranges of the gas turbine engine shafts 26, 28, during which vibration sometimes tends to pose an issue.

The bearing support 40 may also include one or more anti-rotation elements 58 thereon, which prevent unwanted circumferential rotation of the annular body 46 of the bearing support 40 within the gap formed between the bearing 30 and the outer housing 31. The anti-rotation elements 58 may include, as depicted in FIG. 3, axially protruding tangs which engage a corresponding slot or opening provided in the bearing housing 31.

The above description is meant to be exemplary only, and one skilled in the art will recognize that changes may be made to the embodiments described without departing from the scope of the claims. A turbofan gas turbine engine is illustrated as an example for application of this bearing support. However, the described bearing support may be applicable to various types of bearings in various types of gas turbine engines, as well as various types of bearings. Still other modifications which fall within the scope of the present application will be apparent to those skilled in the art, in light of a review of this disclosure, and such modifications are intended to fall within the appended claims.

The invention claimed is:

1. A bearing arrangement for radially supporting a rotatable shaft within a gas turbine engine, the bearing arrangement comprising:
    a bearing having an inner race adapted to be mounted to the shaft and an outer race;
    a bearing housing adapted to be mounted within a casing of the gas turbine engine; and
    a bearing support ring radially disposed between the bearing housing and the outer race of the bearing, the ring having a plurality of circumferentially alternating and spaced apart first and second contact pads, the first and second contact pads respectively radially protruding from inner and outer circumferential surfaces of the ring, the first contact pads being circumferentially offset from the second contact pads such as to define flexible portions of the ring therebetween, the flexible portions of the ring having a radial thickness less than that of the ring at respective locations of said first and second contact pads, the flexible portions permitting elastic deflection of the ring in a radial direction between adjacent ones of the first and second pads, wherein a radial gap exists between the first and second contact pads and the outer race of the bearing and the bearing housing, respectively, when the flexible portions of the bearing support are un-deflected, and a plurality of openings extending transversely across the flexible portions of the ring, the openings sized to permit a substantially unrestricted flow of oil between radially inner and outer sides of said ring.

2. The bearing arrangement as defined in claim 1, wherein an inner oil chamber is defined between each adjacent pairs of said first pads on the inner surface of the ring and the outer race of the bearing, and an outer oil chamber is defined between each adjacent pairs of said second pads on the outer surface of the ring and the bearing housing, said inner oil chambers and said outer oil chambers are in fluid flow communication via at least one of said openings extending through the ring.

3. The bearing arrangement as defined in claim 1, wherein the bearing support is concentric with both said bearing and said bearing housing when un-deflected.

4. The bearing arrangement as defined in claim 1, wherein the first contact pads surround an outer surface of the outer race of the bearing and the second contact pads are received within an inner surface of the bearing housing, the first and second contact pads respectively abutting at least one of said outer surface of the bearing outer race and said inner surface of the bearing housing when vibrations in the bearing cause deflection of the flexible ring.

5. The bearing arrangement as defined in claim 1, wherein the bearing support ring is circumferentially continuous and integrally formed of a unitary piece.

6. The bearing arrangement as defined in claim 1, wherein the bearing support ring has a spring constant selected to allow deflection of the flexible portions thereof at gas turbine engine operating conditions.

7. The bearing arrangement as defined in claim 1, wherein the bearing supports a rotating main engine shaft in the gas turbine engine.

8. The bearing arrangement as defined in claim 1, wherein the flexible portions of the ring elastically deflect to at least partially absorb a radial bearing load transferred to the bearing support ring from the bearing.

9. A bearing support for supporting a rotating shaft bearing within a bearing housing of a gas turbine engine, the bearing support comprising:
   an annular body defining a radially inner circumferential and a radially outer circumferential surface;
   a plurality of circumferentially spaced apart first contact pads disposed on the radially inner circumferential surface of the annular body, and a plurality of circumferentially spaced apart second contact pads disposed on the radially outer circumferential surface of the annular body, the second contact pads being circumferentially offset from the first contact pads, the first and second contact pads having a radial thickness greater than that of portions of the annular body circumferentially disposed between the first and second contact pads, said portions being elastically deflectable in a radial direction, the first contact pads being adapted for abutting an outer race of the bearing and the second contact pads being adapted for abutting the bearing housing of the gas turbine engine, and wherein a radial gap exists between the first contact pads and the outer race of the bearing and between the second contact pads and the bearing housing, when said portions of the annular body are un-deflected; and
   a plurality of oil-flow openings extending at least transversely across the annular body, said openings being oversized to permit substantially un-restricted oil to flow therethrough between radially inner and outer sides of said annular body.

10. The bearing support as defined in claim 9, wherein said portions of the annular body circumferentially disposed between the first and second contact pads are flexible, permitting elastic deflecting of said portions to at least partially absorb a radial bearing load transferred to the bearing support from the bearing.

11. The bearing support as defined in claim 9, wherein at least said portions of the annular body have a common spring constant selected to allow elastic deflection thereof at gas turbine engine operating conditions.

12. The bearing support as defined in claim 9, wherein an inner oil chamber is defined between each adjacent pairs of said first contact pads on the radially inner circumferential surface of the annular body and the outer race of the bearing, and an outer oil chamber is defined between each adjacent pairs of said second contact pads on the radially outer circumferential surface of the annular body and the bearing housing, said inner oil chambers and said outer oil chambers being in fluid flow communication via one or more of said passages extending through the annular body.

13. The bearing support as defined in claim 9, wherein said oil-flow openings are located within said portions of the annular body disposed between the first and second contact pads, one or more of said passages being circumferentially located between each adjacent first and second pad.

14. A bearing support for radially supporting a rotating shaft bearing within a surrounding housing in a gas turbine engine, the bearing support comprising:
   a ring having circumferentially successive first and second portions, the first portions being adapted for abutment with the surrounding housing and the rotating shaft bearing, the second portions disposed between each pair of said first portions being more flexible than the first portions, such as to permit elastic deflection of said second portions in a radial direction; and
   wherein the first portions directly transmit a radial bearing load to the housing when forced into contact therewith by bearing misalignment or vibration, and the second portions elastically deflect to at least partially absorb said bearing misalignment or vibration; and
   wherein a radial gap exists between the first portions of the ring and an outer race of the rotating shaft bearing, at least when said second portions of the ring are un-deflected.

15. The bearing support as defined in claim 14, wherein the first portions of the ring include radially projecting pads alternately inwardly and outwardly projecting from the ring.

16. The bearing support as defined in claim 15, wherein the radially projecting pads have a radial thickness greater than that of said second portions of the ring.

17. The bearing support as defined in claim 15, wherein the radially projecting pads include a plurality of circumferentially spaced apart first contact pads disposed on a radially inner circumferential surface of the ring, and a plurality of circumferentially spaced apart second contact pads disposed on a radially outer circumferential surface of the ring, the second contact pads being circumferentially offset from the first contact pads.

18. The bearing support as defined in claim 14, wherein a plurality of oil-flow passages extending transversely across the second portions of the ring, said passages being oversized to permit substantially un-restricted liquid oil to flow therethrough between radially inner and outer sides of said ring.

19. The bearing support as defined in claim 18, wherein an inner oil chamber is defined between each adjacent pairs of said first contact pads on the radially inner circumferential surface of the ring, and an outer oil chamber is defined between each adjacent pairs of said second contact pads on the radially outer circumferential surface of the ring, said inner oil chambers and said outer oil chambers being in fluid flow communication via said oil-flow passages extending through the second portions of the ring.

* * * * *